United States Patent [19]
Boileau et al.

[11] 4,061,171
[45] Dec. 6, 1977

[54] NONREINFORCED TIRE

[75] Inventors: Jacques Boileau, Clermont-Ferrand; Albert Mathevet, Chamalieres, both of France

[73] Assignee: Compagnie Generale des Etablissements Michelin, France

[21] Appl. No.: 693,967

[22] Filed: June 7, 1976

[30] Foreign Application Priority Data
June 12, 1975   France ................... 75.18481

[51] Int. Cl.² .............. B60C 5/00; B60C 13/00; B60C 15/00
[52] U.S. Cl. .............. 152/352 R; 152/353 R; 152/353 C; 152/354 R; 152/357 A; 152/362 R
[58] Field of Search .............. 152/352, 353 R, 353 C, 152/354, 362 R, 330 R, 357 A

[56] References Cited
U.S. PATENT DOCUMENTS

| Re. 15,518 | 1/1923 | Schwartz | 152/353 C |
| 1,862,269 | 6/1932 | Johnson | 152/352 |
| 3,392,772 | 7/1968 | Powers | 152/352 |
| 3,631,913 | 1/1972 | Boileau | 152/354 |
| 3,916,968 | 11/1975 | Masson | 152/353 R |

Primary Examiner—Drayton E. Hoffman
Attorney, Agent, or Firm—Brumbaugh, Graves, Donohue & Raymond

[57] ABSTRACT

Tire with a tread-forming crown extended on both sides by sidewalls terminating in a bead, said tire being made of elastic material and being free of reinforcement.

In accordance with the invention, each sidewall comprises at least one region in which the thickness varies and the median line of which has a curvature which changes sign, said tire being mounted on a rim and inflated.

31 Claims, 5 Drawing Figures

NONREINFORCED TIRE

The present invention relates to improvements in tires and, more particularly, in tires which are entirely or partially free of reinforcement.

The tires marketed at the present time all have a reinforcement. Embedded in the elastomeric mass of the tire and adhering to it, the reinforcement consists of filiform materials which are less elastic and more resistant than the elastomeric mass and are dispersed in the latter or combined in plies of reinforcement elements (filaments, cords, etc.) which are parallel to each other in each ply. Due to its adherence to the elastomeric mass of the tire, the reinforcement participates in the deformations of the tire so as to limit the amplitude of these deformations and thus avoid the premature breaking of the elastomeric mass.

However, in the manufacture of tires, the including of a reinforcement in the elastomeric mass is considered to constitute an expensive major complication.

In the tires at present in use, such a reinforcement, despite its obvious utility, is a source of drawbacks and various proposals have already been made in order to eliminate the reinforcement of tires, at least in part. For example, it has been proposed to replace the combination of reinforcement and elastomeric mass by one or more elastic materials which are isotropic in the absence of stresses and have improved mechanical properties. Thus, for instance, in order to withstand the static stresses due to inflation, materials having a uniform resistance to the increased tension have been proposed. Moreover, in order to limit the amplitude of the deformations in operation, it has been recommended that the moduli of elasticity of said materials be increased.

One drawback of such solutions is that they lead to the use of materials the working of which is relatively expensive and therefore has a large effect on the cost of the tires in question, despite the simplifications introduced into their manufacture.

The research work and tests carried out by the applicants have shown that the local distribution of the material or materials constituting the said nonreinforced tires exerted a predominant influence on the local distribution of the stresses and therefore on the properties of said tires, and particularly their life. In particular, it was found that the lack of endurance appeared first of all in the regions where the shear stresses are substantial or even maximum. In these areas the first initial breaks occur. They are then propagated into the mass of the tire, until the latter becomes unusable. Generally, it is the region adjacent the tread, namely the shoulder of the tire, which is most susceptible to fatigue.

On the other hand, when costly materials are used, the greatest endurance should be obtained for the smallest quantity of material used, that is to say these materials should be used in a rational manner.

The object of the present invention is to overcome these drawbacks by arranging the elastic material or materials used in appropriate manner in a nonreinforced tire.

The tire in accordance with the invention, having a tread-forming crown extended on both sides by a sidewall terminating in a bead, and which tire is without reinforcement and consists of one or more elastic materials, is characterized by the fact that each sidewall, as seen in radial section, has, on the one hand, at least one zone in which the thickness varies and has, on the other hand, a median line having a curvature which changes sign, said zone being adjacent to a zone whose thickness is substantially constant, the said tire being mounted on a rim and inflated.

The expressions used above are defined below.

The median line is the line of the centers of circles which are tangent both to the outer wall and to the inner wall of the tire, as seen in radial section, each of these circles being entirely included within said radial section.

The curvature at any point of the median line is the reciprocal ($1/R$ of the radius $R$ of curvature of said line at this point.

It is pointed out that when the curvature changes sign, the center of curvature which was on one side of the median line changes to the other side of the median line. By convention, it is held that when the median line has its concavity facing the equatorial plane of the tire the curvature is positive, while otherwise it is negative.

The thickness of the tire in accordance with the invention at a given point of the median line is the length of the straight line segment normal to the median line contained between the points of intersection of this straight line with the walls of the tire.

The expression "elastic materials" presupposes that the tire of the invention can be made of several different materials, provided that they are elastic. In particular, the tread may be made of several materials which are superimposed in radial direction.

It should also be pointed out that the expression "nonreinforced" does not exclude the presence of bead wires. In the case of the invention, the presence of wires in the beads, as a matter of fact, corresponds only to the necessity of effectively holding the tire on the wheel rim.

A preferred means for obtaining a median line of reversed curvature consists in arranging in the sidewall, without interruption of continuity, at least one sequence of zones A, B, C, D, in the following manner:

On both sides of a zone C of constant thickness, or of relatively small variation of thickness per unit of length of the median line, the sidewall comprises:

- a zone B in which the thickness of the tire increases considerably as it moves away from the zone C, the thickness of the zone B at the end thereof opposite the zone C being at least 2 times the thickness of the zone C;

- a terminal zone D in which the thickness of the tire increases, but less so than in the zone B, as it moves away from the zone C, the ratio of the increase in thickness of the zone D per unit of length of the median line being less than the ratio of increase in thickness of the zone B per unit of length of the median line; and

- a terminal zone A following the zone B and whose maximum thickness, which may be constant, is equal to at least the greatest thickness of the zone B.

By using this means one can obtain, under the effect of the inflation pressure, an equilibrium profile of the sidewall which, seen in radial section, has a median line with a reversal of curvature. In general, this reversal is located in the zone B, but it may also be located in the zone C, in the vicinity of the junction between the zones B and C, although it is preferable for the reversal to be located in the zone B. The (practically constant) thickness of the terminal zone A may be different from the thickness of the end portion of the terminal zone D. Likewise, the median lines of the terminal zones A and D can be placed at the same axial distance from the equatorial plane of the tire or at different distances from it.

The terminal zone A may also, for instance, be part of the edge of the tread of the tire and the thick end of the terminal zone D may be part of the bead. Conversely, the end portion (the thickest portion) of the terminal zone D may be part of the edge of the tread and the terminal zone A may be part of the bead. Moreover, it is advisable to impart a certain thickness to the tread in order to assure suitable resistance to wear of the tire in accordance with the invention. For this purpose, the tread proper can, for instance, be superimposed on the body of the tire. The same may be true of the beads, in order to reinforce their adherence to the rim seats.

The invention also extends to the variants described below which are based, at least in part, on the preferential means explained above. In these variants, the reversal of curvature of the median line of the sidewalls is again preferably located in the zones marked B.

A first variant provides for the use of two sequences of zones such as $(A_1-B_1-C_1)$ and $(A_2-B_2-C_2)$. By combining these two sequences at their thinnest adjacent zones $C_1$ and $C_2$, one obtains a continuous assembly $(A_1-B_1-C_1)-(C_2-B_2-A_2)$.

With this arrangement, the two adjacent zones $C_1$ and $C_2$ can be combined to form a single zone $C_{1,2}$ and one can produce a continuous assembly such as $A_1-B_1-C_{1,2}-B_2-A_2$.

The thicknesses of the two terminal zones $A_1$ and $A_2$ as well as the laws governing the variation of the thicknesses of the two intermediate zones $B_1$ and $B_2$ may be different.

This first variant makes it possible to provide a median line with one or two reversals of curvature.

In order to obtain a single reversal, the median lines of the said two terminal zones $A_1$ and $A_2$ are shifted axially. This shift is preferably equal to at least the width of the narrower of the two zones $A_1$ and $A_2$. The single reversal of curvature is located in the zone B, whose distance from the equatorial plane of the tire is the greatest.

In order to obtain two reversals of curvature, the median lines of the two terminal zones $A_1$ and $A_2$ should be located approximately at the same axial distance from the equatorial plane of the tire.

A second variant contemplates the case in which one uses at least two assemblies of sequences of zones in accordance with the first variant above, for instance $(A_1-B_1-C_{1,2}-B_2-A_2)$ and $(A_3-B_3-C_{3,4}-B_4-A_4)$. These two combinations are connected at two of their thick terminal zones, for instance $A_2$ and $A_3$. One can thus obtain an assembly having four reversals of curvature of the median line, namely: $(A_1-B_1-C_{1,2}-B_2-A_2) - (A_3-B_3-C_{3,4}-B_4-A_4)$. The two adjacent terminal zones $A_2$ and $A_3$ are preferably combined to form a single zone $A_{2,3}$.

A third variant contemplates combining at least two sequences of zones such as (A—B—C—D) at their terminal ends of the same type A, and/or different types A and D. Thus, by using two sequences of zones such as $(A_1-B_1-C_1-D_1)$ and $(A_2-B_2-C_2-D_2)$, one obtains one of the three continuous assemblies:

$(A_1-B_1-C_1-D_1) - (A_2-B_2-C_2-D_2)$,
$(A_1-B_1-C_1-D_1) - (D_2-C_2-B_2-A_2)$ and
$(D_1-C_1-B_1-A_1) - (A_2-B_2-C_2-D_2)$.

The adjacent zones $D_1$ and $A_2$, $D_1$ and $D_2$, or $A_1$ and $A_2$ preferably have equal thicknesses along their connecting surfaces. The two adjacent zones $A_1$ and $A_2$ are preferably also combined to form a single zone $A_{1,2}$.

As can be seen, the combinations of zones in accordance with the three above variants entail terminal thickenings of type A and D, respectively. It may be advantageous for one of these terminal thickenings to be part of the tread, and the other part of the bead of the tire. This measure may advantageously be combined with a thickening of the tread and/or the bead of the tire, this thickening being considered with reference to the customary thicknesses of the tread and/or the beads of tires provided with reinforcement.

In general, in the combinations of zones in accordance with the three above variants, the different zones of types A, B, C, D may have thicknesses, or laws of variation of thickness per unit of length of the median line, which differ from one assembly of zones to the other. Moreover, the median lines of the different terminal zones of type A or D may be shifted to a greater or lesser extent axially with respect to the equatorial plane of the tire.

FIGS. 1 to 5 of the drawing show, by way of illustration and not of limitation, a few forms of radial cross-sections of nonreinforced tires in accordance with the invention.

FIGS. 1 and 2 show sections through tires having sidewalls 11 and 21, respectively, whose concavity faces the equatorial plane (indicated by the line XX' in the plane of the drawing).

Figure 1:
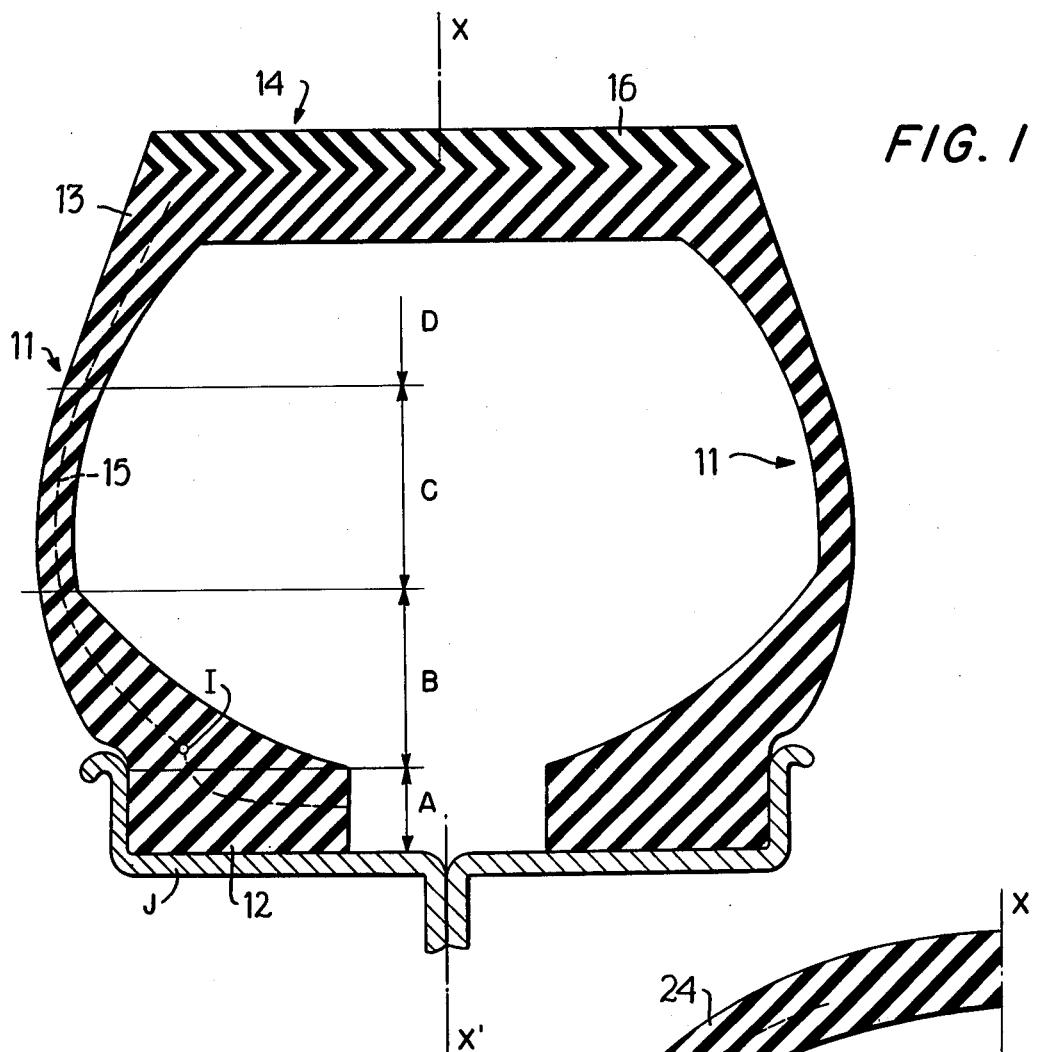
Figure 2:
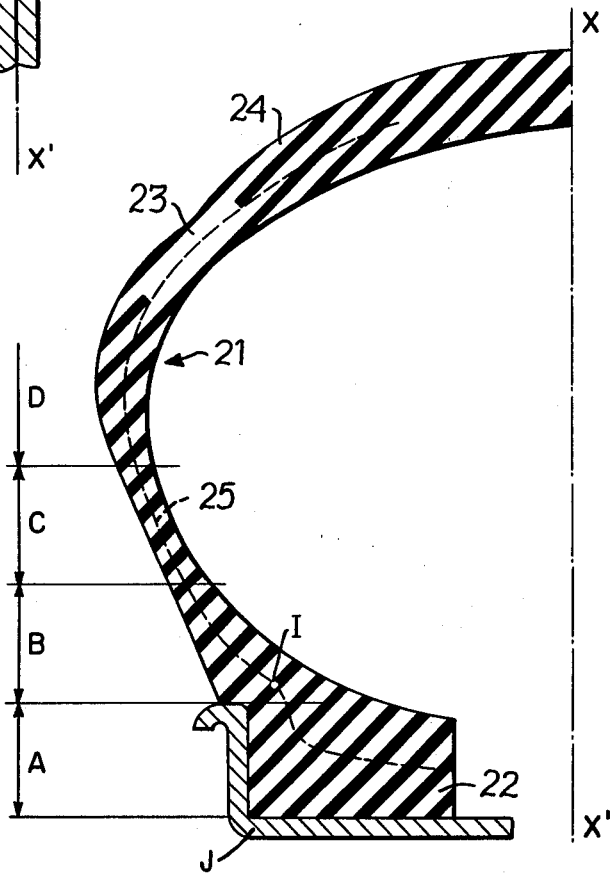

Referring to FIGS. 1 and 2, these sidewalls 11 and 21 have sequences of zones of the type (A—B—C—D). In the two examples shown, the terminal zones A are part of the beads 12 or 22, the latter being thicker than the beads of the customary tires having a reinforcement. The ends 13 or 23 of the terminal zones D form part of the tread 14 or 24.

In the tire of FIG. 1, the reversal I of the curvatures of the median line 15 of the sidewalls 11 is located in zone B which is of greatly increasing thickness. Zone C, which is the thinnest of the zones A, B, C and D, has a constant thickness, in accordance with the preferential means described above. The thickness of the terminal zone D increases slowly, and less rapidly than that of the zone B, in the direction towards the cylindrical tread 14. This tread is of relatively great thickness, obtained by applying radially to the outside of the tire a layer of material 16, possibly a material different from that of the balance of the tire.

In the tire of FIG. 2, the reversal I of the curvatures of the median line 25 of the sidewalls 21 is also located in the zone B. As can be seen, the tread 24 is thinner than in the tire of FIG. 1 and has a strong curvature.

The tires shown in FIGS. 1 and 2 have beads 12 or 22 which are thicker than those of tires having a reinforcement. The axial width of these beads is equal to about 1/3 of the width of the rim J, this width being defined in accordance with the standard.

Figure 3:
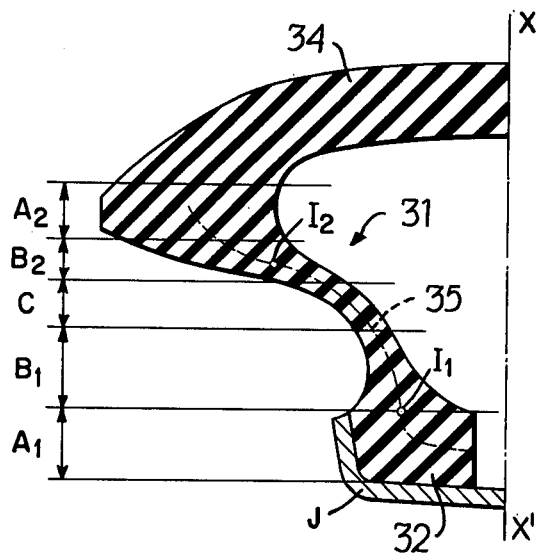
FIG. 3 shows a section through a tire whose sidewalls 31 have their concavity facing the outside, as known per se, for instance, from British Pat. No. 313,649 (Roadless Traction) of 1928.

Referring to FIG. 3, the sidewalls 31 have two sequences of zones of the type (A—B—C) connected to each other by their adjacent zones C, which are combined together to form a single zone, in accordance with one feature of the first variant. The median line 35 of the sidewalls in this example has a reversal of curvature $I_2$ in the zone $B_2$ of the tread, due to a relatively substantial axial shift of the terminal zones of the type A, one of them ($A_1$) being part of the bead 32 and the other ($A_2$) being part of the tread 33.

Moreover, the tread 34 has a curvature whose concavity is directed towards the axis (not shown) of the tire, as well as a relatively great thickness.

Figure 4:
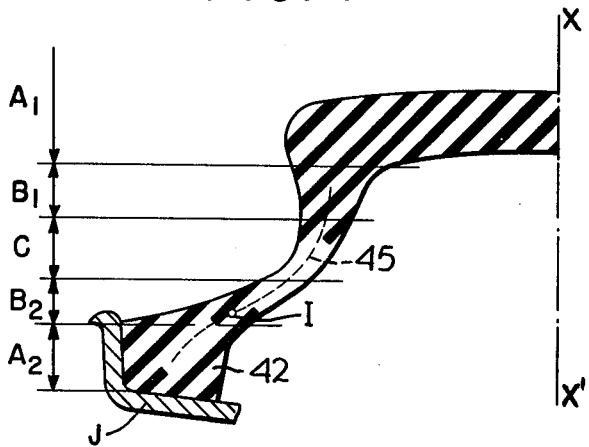
FIG. 4 shows an example of a section through a tire made in accordance with the same principal as the tire of FIG. 3 but with the axial shift of the terminal zones A being effected in the opposite direction.

Referring to FIG. 4, in this case, the terminal zone $A_2$, which is part of the bead 42, is the farthest axially from the equatorial plane XX'. The reversal I of the median plane 45 is located in the zone $B_2$.

Figure 5:
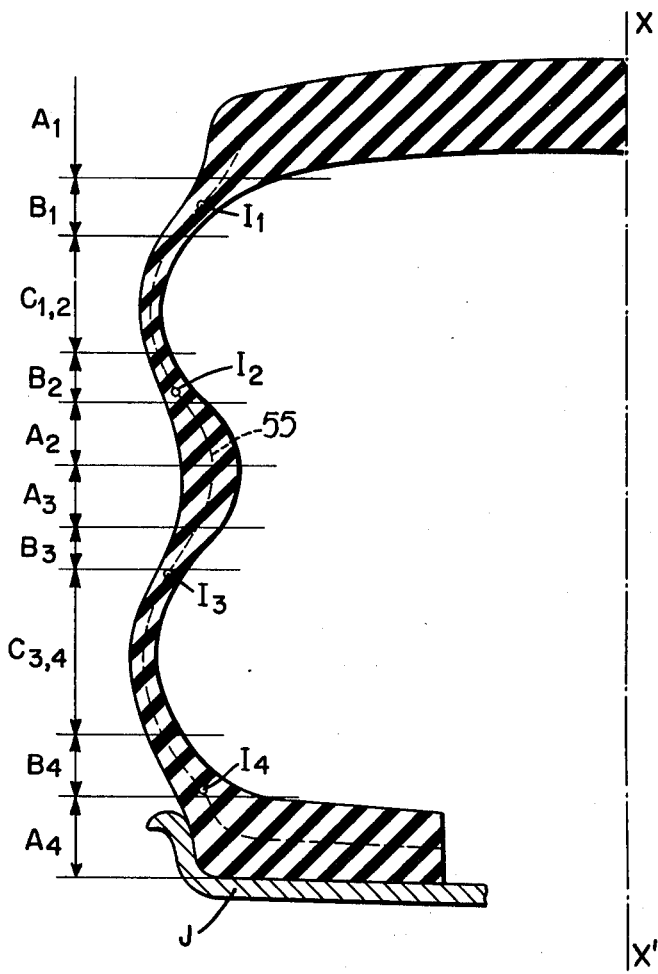
FIG. 5 illustrates an example of a section through a tire in accordance with the second variant described above.

Referring to FIG. 5, as can be seen, the median line 55 has four reversals of curvature $I_1$, $I_2$, $I_3$ and $I_4$. In this tire, it is sufficient, for example, to replace two zones of type A by two zones of type D in order to obtain a tire (not shown) in accordance with the third variant described above.

It goes without saying that the invention extends also to tires, the different portions or zones of which are produced by means of a single material or of different materials provided that they are elastic and assure, at least in the case of some of them, the continuity from one bead of the tire to the other.

Since the radial profiles of the tires in accordance with the invention are obtained by the combined effects of a special distribution of elastic material and of the inflation pressure, these tires may have a different radial profile when not mounted and not inflated than that which they have in inflated mounted condition.

What is claimed is:

1. In a nonreinforced inflated tire mounted on a wheel rim, said tire consisting of at least one elastic material and having a tread-forming crown extended on both sides by a sidewall terminating in a bead, each sidewall as seen in radial section having an outer wall and an inner wall and a median line which is the line of the centers of circles which are tangent both to said outer wall and to said inner wall, each circle being entirely included within said radial section, the improvement which comprises each sidewall has at least one sequence of zones A, B, C, D without interruption of continuity, formed of a zone C of substantially constant thickness, and, on opposite sides of the zone C, a zone B in which the thickness of the tire increases as it moves away from the zone C, the thickness of this zone B at its end opposite zone C being at least two times the thickness of the zone C, and a terminal zone D in which the thickness of the tire increases as it moves away from the zone C, the ratio of the increase in thickness of the zone D per unit of length of the median line being less than the ratio of increase in thickness of the zone B per unit of length of the median line, and finally a terminal zone A following the zone B and whose maximum thickness is equal to at least the greatest thickness of the zone B, said median line having a reversal of curvature which is located in a zone B.

2. The tire according to claim 1 wherein the median lines of the terminal zones A and D are shifted axially with respect to each other.

3. The tire according to claim 1 wherein each sidewall has a single sequence of said zones A, B, C, D and one of the terminal zones A and D forms part of the tread and the other forms part of the bead.

4. The tire according to claim 1 wherein each sidewall has two sequences of said zones A, B, C, D, such as $A_1$—$B_1$—$C_1$—$D_1$ and $A_2$—$B_2$—$C_2$—$D_2$, these two sequences of zones being connected by the terminal zones of types A and D so as to form a continuous assembly $A_1$—$B_1$—$C_1$—$D_1$ — $A_2$—$B_2$—$C_2$—$D_2$.

5. The tire according to claim 1 wherein each sidewall has two sequences of said zones A, B, C, D, such as $A_1$—$B_1$—$C_1$—$D_1$ and $A_2$—$B_2$—$C_2$—$D_2$, these two sequences of zones being connected by the terminal zones of type D so as to form a continuous assembly $A_1$—$B_1$—$C_1$—$D_1$— $D_2$—$C_2$—$B_2$—$A_2$.

6. The tire according to claim 1 wherein each sidewall has two sequences of said zones A, B, C, D, such as $A_1$—$B_1$—$C_1$—$D_1$ and $A_2$—$B_2$—$C_2$—$D_2$, these two sequences of zones being connected by the terminal zones of type A so as to form a continuous assembly $D_1$—$C_1$—$B_1$—$A_1$ — $A_2$—$B_2$—$C_2$—$D_2$.

7. The tire according to claim 1 wherein each sidewall has two sequences of said zones A, B, C, D, such as $A_1$—$B_1$—$C_1$—$D_1$ and $A_2$—$B_2$—$C_2$—$D_2$, these two sequences of zones being connected by the terminal zones of type A which are combined into a single zone $A_{1,2}$ so as to form a continuous assembly $D_1$—$C_1$—$B_1$—$A_{1,2}$—$B_2$—$C_2$—$D_2$.

8. The tire according to claim 3 wherein the beads are of large thickness.

9. The tire according to claim 3 wherein the tread is of large thickness.

10. The tire according to claim 3 wherein the beads and the tread are of large thickness.

11. In a nonreinforced inflated tire mounted on a wheel rim, said tire consisting of at least one elastic material and having a tread-forming crown extended on both sides by a sidewall terminating in a bead, each sidewall as seen in radial section having an outer wall and an inner wall and a median line which is the line of the centers of circles which are tangent both to said outer wall and to said inner wall, each circle being entirely included within said radial section, the improvement which comprises each sidewall has at least one sequence of zones A, B, C, D without interruption of continuity, formed of a zone C of substantially constant thickness, and, on opposite sides of the zone C, a zone B in which the thickness of the tire increases as it moves away from the zone C, the thickness of this zone B at its end opposite zone C being at least two times the thickness of the zone C, and a terminal zone D in which the thickness of the tire increases as it moves away from the zone C, the ratio of the increase in thickness of the zone D per unit of length of the median line being less than the ratio of increase in thickness of the zone B per unit of length of the median line, and finally a terminal zone A following the zone B and whose maximum thickness is equal to at least the greatest thickness of the zone B, said median line having a reversal of curvature which is located in a zone C in the vicinity of the junction between zones B and C.

12. In a nonreinforced inflated tire mounted on a wheel rim, said tire consisting of at least one elastic material and having a tread-forming crown extended on both sides by a sidewall terminating in a bead, each sidewall as seen in radial section having an outer wall and an inner wall and a median line which is the line of the centers of circles which are tangent both to said outer wall and to said inner wall, each circle being entirely included within said radial section, the improvement which comprises each sidewall has at least one assembly of two sequences of zones A, B, C, such As $A_1$—$B_1$—$C_1$ and $A_2$—$B_2$—$C_2$, without interruption of continuity, formed of a zone C of substantially constant thickness, a zone B joined to zone C in which the thickness of the tire increases as it moves away from the zone C, the thickness of this zone B at its end opposite zone C being at least two times the thickness of the zone C, and a terminal zone A following the zone B and whose maximum thickness is equal to at least the greatest thickness of the zone B, these two sequences of zones being connected to each other at their thinnest adjacent zones $C_1$ and $C_2$ so as to form a continuous assembly $A_1$—$B_1$—$C_1$—$C_2$—$B_2$—$A_2$, said median line having at least one reversal of curvature which is located in a zone B.

13. The tire according to claim 12 wherein the thinnest adjacent zones $C_1$ and $C_2$ are combined into a single zone $C_{1,2}$ so as to form a continuous assembly $A_1$—$B_1$—$C_{1,2}$—$B_2$—$A_2$.

14. The tire according to claim 12 wherein the median lines of the two terminal zones $A_1$ and $A_2$ are located approximately at the same axial distance from the equatorial plane of the tire, the median line of the radial section of the sidewall having two reversals of curvature.

15. The tire according to claim 12 wherein the median lines of the two terminal zones $A_1$ and $A_2$ are shifted axially with respect to each other, the median line of the radial section of the sidewall having a single reversal of curvature which is located in the zone B whose distance from the equatorial plane of the tire is the greatest.

16. The tire according to claim 15 wherein the median lines of the two terminal zones $A_1$ and $A_2$ are shifted axially with respect to each other by a distance equal to at least the width of the narrower of the two zones $A_1$ and $A_2$.

17. The tire according to claim 12 wherein each sidewall has a single assembly of two sequences of zones and one of the two terminal zones $A_1$ and $A_2$ forms part of the tread and the other forms part of the bead.

18. The tire according to claim 12 wherein each sidewall has at least two assemblies of two sequences of zones A, B, C, such As $A_1$—$B_1$—$C_{1,2}$—$B_2$—$A_2$ and $A_3$—$B_3$—$C_{3,4}$—$B_4$—$A_4$, these two assemblies being connected at two of the adjacent terminal zones of maximum thickness $A_1$, $A_2$, $A_3$, $A_4$.

19. The tire according to claim 18 wherein the median lines of at least two zones $A_1$, $A_2$, $A_3$, $A_4$ are shifted axially with respect to each other.

20. The tire according to claim 19 wherein one of the terminal zones of the connection of the said continuous assemblies forms part of the tread and the other forms part of the bead.

21. The tire according to claim 20 wherein the median lines of at least two of the terminal zones of type A are shifted in axial direction with respect to each other.

22. The tire according to claim 20 wherein one of the terminal zones of the connection of the said sequences forms part of the tread and the other forms part of the bead.

23. The tire according to claim 17 wherein the beads are of large thickness.

24. The tire according to claim 17 wherein the tread is of large thickness.

25. The tire according to claim 17 wherein the beads and the tread are of large thickness.

26. The tire according to claim 20 wherein the beads are of large thickness.

27. The tire according to claim 20 wherein the tread is of large thickness.

28. The tire according to claim 20 wherein the beads and the tread are of large thickness.

29. The tire according to claim 22 wherein the beads are of large thickness.

30. The tire according to claim 22 wherein the tread is of large thickness.

31. The tire according to claim 22 wherein the beads and the tread are of large thickness.

* * * * *